United States Patent
Keim et al.

(10) Patent No.: US 7,171,656 B2
(45) Date of Patent: Jan. 30, 2007

(54) GENERIC EMBEDDED APPLICATION TECHNOLOGY ARCHITECTURE

(75) Inventors: Dale O. Keim, Torrance, CA (US); Shahram Rahmani, Irvine, CA (US)

(73) Assignee: The Boeing Company, Chicago, IL (US)

( * ) Notice: Subject to any disclaimer, the term of this patent is extended or adjusted under 35 U.S.C. 154(b) by 610 days.

(21) Appl. No.: 10/408,216

(22) Filed: Apr. 8, 2003

(65) Prior Publication Data

US 2004/0205699 A1 Oct. 14, 2004

(51) Int. Cl.
*G06F 9/45* (2006.01)
(52) U.S. Cl. .................................... 717/148
(58) Field of Classification Search ........ 717/104–118, 717/136–148; 715/762; 719/328
See application file for complete search history.

(56) References Cited

U.S. PATENT DOCUMENTS

| | | | | |
|---|---|---|---|---|
| 5,842,020 | A * | 11/1998 | Faustini | 395/701 |
| 6,289,506 | B1 * | 9/2001 | Kwong et al. | 717/9 |
| 6,675,371 | B1 * | 1/2004 | York et al. | 717/114 |
| 2003/0126590 | A1 * | 7/2003 | Burrows et al. | 717/131 |

OTHER PUBLICATIONS

Sun Microsystems, The Java Virtual Machine Spefification, 1999, Sun Microsystems Inc. ☐☐http://web.archive.org/web/19990508124421/http://java.sun.com/docs/books/vmspec/2nd-edition/html/VMSpecTOC.doc.html.*
Emacs, "17.Byte Compilation", Feb. 21, 2002, pp. 1-12, <http://web.archive.org/web/20020221091424/http://www.zvon.org/other/elisp/Output/SEC198.html>.*

* cited by examiner

*Primary Examiner*—Kakali Chaki
*Assistant Examiner*—Tuan Anh Vu
(74) *Attorney, Agent, or Firm*—Lee & Hayes, PLLC

(57) ABSTRACT

A generic embedded application technology architecture partitions the application software into code and data objects in an optimal way such that: a) a set of embedded software objects and data (non-code with both static and dynamic attributes) define the specific characteristics of the application, the objects and data being disposed under "object files" or "Bytecode"; b) the code is disposed under an entity called a Virtual Engine (VE) (software code), that manipulates (interprets) the embedded software objects and data or information provided by the data objects (i.e., Bytecode) to produce the desired functionality or outputs (information or actions); and c) because of this optimal partitioning, software application development is then reduced to "data object definition" only, since the VE is reusable within a "domain" or application class.

53 Claims, 2 Drawing Sheets

GENERIC EMBEDDED APPLICATION TECHNOLOGY ARCHITECTURE

The present invention relates generally to a generic embedded application technology architecture that allows a user to enter data objects without having to create a new application software code to produce the desired software product.

BACKGROUND OF THE INVENTION

Every year, billions of dollars are spent under government and commercial projects to develop application software for embedded systems, including those used for transportation systems, defense systems, communication systems, automation systems, control systems, "smart" systems, etc. Nearly in all such cases, the application software (that is, the code) is developed and generated from scratch. Other advanced methods for producing application software that are currently used in the industry, include automatic code (auto-code) generation of the application software (from a specification).

The re-use of this application software is only considered cost-effective if the new, embedded system is very similar to the previously developed system (such as the flight management application software used in airplanes). Even in such cases, many "re-use" attempts fail to be cost effective due to hidden dependencies and unique attributes that make such application software products incompatible.

Thus, an architecture where the user does not have to re-create the software code for each new application is highly desirable. Further, architecture that allows the user to produce data objects (that define all unique functionality and characteristics of an application software) without having to create a new application software code to produce the desired software product is desired.

SUMMARY OF THE INVENTION

In one aspect of the present invention, the generic embedded application technology architecture partitions the application software into code and data object in an optimal way such that:

a) a set of embedded software objects and data (non-code with both static and dynamic attributes) define the specific characteristics of the application, the objects and data being disposed under "object files" or "Bytecode";

b) the code is disposed under an entity called a Virtual Engine (VE) (software code) that manipulates (interprets) the embedded software objects and data or information provided by the data objects (i.e., Bytecode) to produce the desired functionality or outputs (information or actions); and c) because of this optimal partitioning, software application development is then reduced to "data object definition" only, since the VE is reusable within a "domain" or application class.

In another aspect consistent with the present invention, a method of creating a predetermined application using a generic embedded application technology architecture comprises: receiving a set of user-defined data objects and attributes of said data objects; formatting said data objects into a Bytecode that defines components and attributes of the predetermined application; providing said Bytecode to a Virtual Engine; and generating an output that represents information, functionality, and behavior provided in said Bytecode.

In another aspect, a method of creating a predetermined application using a generic embedded application technology architecture comprises: receiving a set of user-defined data objects and attributes specific to the predetermined application creating using a user interface tool; transforming said user-defined data objects into a Bytecode, said Bytecode which provide information needed by a Virtual Engine to produce a predetermined functionality and products intended for the predetermined application; storing static data of said Bytecode in a Static Object Buffer and making it available to an Output Manager; managing multiple sets of dynamic data of said Bytecode in a Handle Table which includes information on where each dynamic data set is stored and a list of actual output data; storing dynamic data in a Dynamic Update Buffer to prevent one of incorrect usage and access of said dynamic data while said dynamic data is still being updated in said Handle Table; interpreting said dynamic data and updating said Dynamic Update Buffer with said interpreted data; and generating output from said Dynamic Update Buffer to said Output Manager, that represents information provided in said Bytecode.

In yet another aspect, a system for creating a predetermined application from a generic embedded application technology architecture comprises: means for receiving a set of user-defined data objects and attributes of said objects specific to the predetermined application; means for formatting said data objects into a Bytecode that defines components and attributes of the application; means for providing said Bytecode to a Virtual Engine; and means for generating an output that represents information and functionality provided in said Bytecode.

In still another aspect, a system for creating a predetermined application using a generic embedded application technology architecture comprises: means for receiving a set of user-defined data objects and attributes specific to the predetermined application created using a user interface tool; means for transforming said user-defined data objects into a Bytecode, said Bytecode which provides information needed by a Virtual Engine to produce a predetermined functionality and products intended for the predetermined application; means for storing static data of said Bytecode in a Static Object Buffer and making it available to an Output Manager; means for managing multiple sets of dynamic data of said Bytecode in a Handle Table which includes information on where each dynamic data set is stored and a list of actual output data; means for storing dynamic data in a Dynamic Update Buffer to prevent one of incorrect usage and access of said dynamic data while said dynamic data is still being updated in said Handle Table; means for interpreting said dynamic data and updating said Dynamic Update Buffer with said interpreted data; and means for generating output to said Output Manager from said Dynamic Update Buffer, that represents information provided in said Bytecode.

In another aspect, an apparatus for creating a predetermined application using a generic embedded application technology architecture comprises: a user interface tool which creates data objects and attributes of said data objects specific to the predetermined application; an object compiler which formats said data objects and said attributes into a Bytecode; and a Virtual Engine which interprets said Bytecode to produce a predetermined functionality and products intended for the predetermined application.

In still another aspect, a computer-readable medium whose contents cause a computer system to create a predetermined application using a generic embedded application technology architecture, the computer system having a program that performs the steps of: receiving a set of user-defined data objects and attributes of said objects specific to the predetermined application; formatting said data objects into a Bytecode that defines components and attributes of the predetermined application; providing said Bytecode to a Virtual Engine; and generating an output that represents information and functionality provided in said Bytecode.

In yet another aspect, a computer-readable medium whose contents cause a computer system to create a predetermined application using a generic embedded application technology architecture, the computer system having a program that performs the steps of: receiving a set of user-defined data objects and attributes specific to the predetermined application created using a user interface tool; transforming said user-defined data objects into a Bytecode, said Bytecode which provides information needed by a Virtual Engine to produce a predetermined functionality and products intended for the predetermined application; storing static data of said Bytecode in a Static Object Buffer and making it available to an Output Manager; managing multiple sets of dynamic data of said Bytecode in a Handle Table which includes information on where each dynamic data set is stored and a list of actual output data; storing dynamic data in a Dynamic Update Buffer to prevent one of incorrect usage and access of said dynamic data while said dynamic data is still being updated in said Handle Table; interpreting said dynamic data and updating said Dynamic Update Buffer with said interpreted data; and generating output to said Output Manager from said Dynamic Update Buffer that represents information provided in said Bytecode.

In yet another aspect, a computer system for creating a predetermined application using a generic embedded application technology architecture, the computer system comprising: a memory including at least one program for receiving a set of user-defined data objects and attributes of said objects specific to the predetermined application; formatting said data objects into a Bytecode that defines components and attributes of the predetermined application; providing said Bytecode to a Virtual Engine; and generating an output that represents information and functionality provided in said Bytecode; and a processor for running said program.

DETAILED DESCRIPTION OF THE INVENTION

Figure 1:
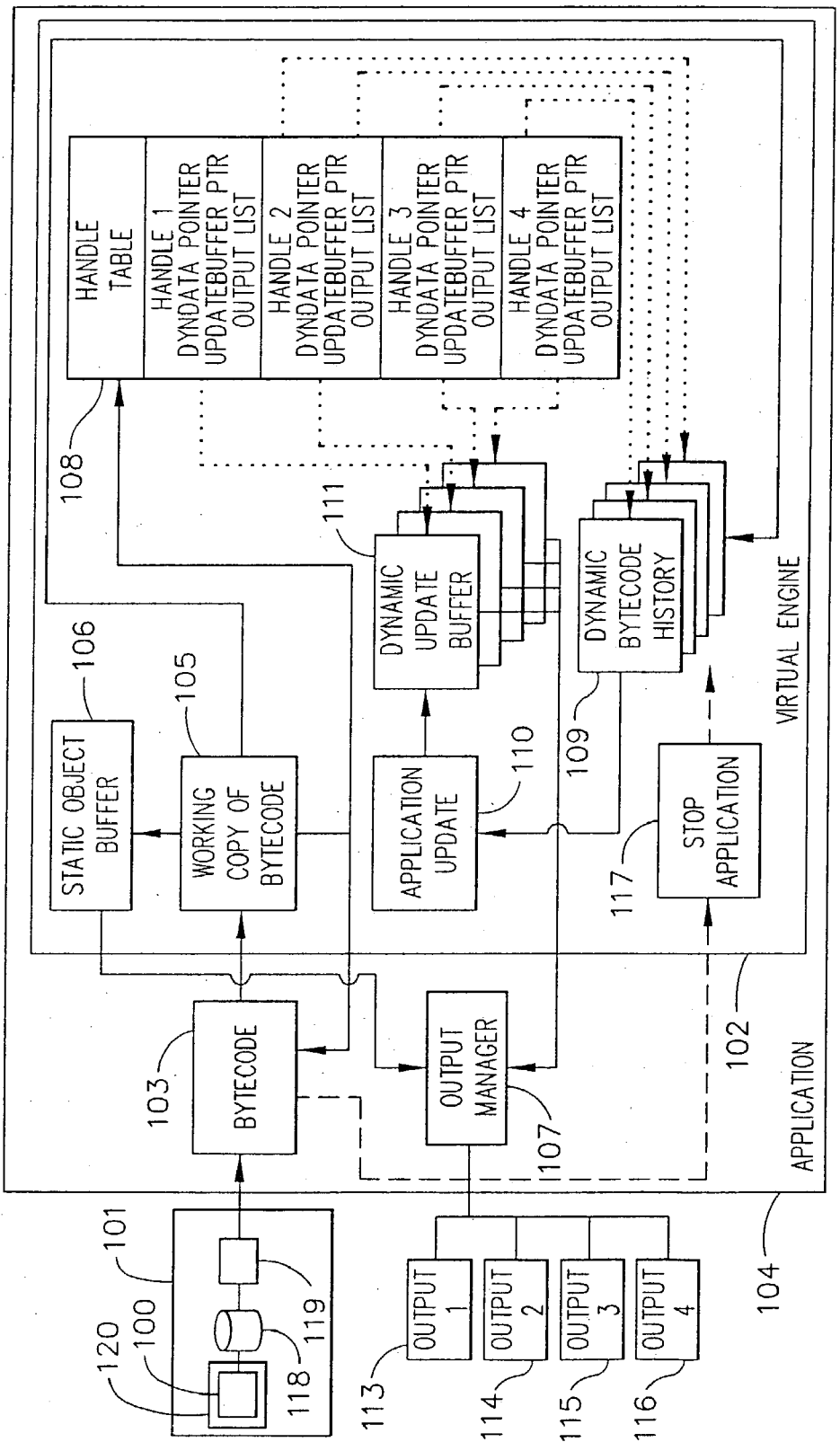
FIG. 1 is a flowchart showing an overview of one embodiment of the methods and system consistent with the present invention.

Methods and systems consistent with the present invention include, in one embodiment, a generic embedded architecture technology that provides a generic solution for embedded software systems. Methods and systems consistent with the present invention include a generic embedded application technology architecture that partitions the application software into code and data objects in an optimal way, such that:

a) a set of embedded software objects and data (non-code with both static and dynamic attributes) define the specific characteristics of the application, the objects and data being disposed under the "object files" or "Bytecode";

b) the code is disposed under an entity called the Virtual Engine (VE) (software code) that manipulates (interprets) the embedded software objects and data or information provided by the data objects (i.e., Bytecode) to produce the desired functionality or outputs (information or actions); and c) because of this optimal partitioning, software application development is then reduced to "data object definition" only, since the VE is reusable within a "domain" or application class.

The VE is one traditional code element of the architecture. This means the VE is the software entity (for the application software) that needs to be executed (in the traditional sense) within the embedded system.

The generic embedded technology architecture consistent with the present invention is applicable to many embedded applications, and when applied for each application class (or domain), a VE, a set of object files (also called a data base), and a supporting tool set would be generated. Examples of such application classes include: 1) displays, 2) caution-warning and health management, 3) control systems, and 4) resource management systems.

Although a distinct VE should be used for each "domain" of embedded applications, all such VEs use the same generic architecture that provides for flexible and cost effective design, implementation, and integration of VEs for various application domains (such as the display domain, control system domain, maintenance and diagnostic domain).

As stated above, one of the architectural characteristics of the generic embedded technology architecture consistent with the present invention is that the VE is "reusable" within an application "domain". That is, for each software application domain (such as Caution and Warning (CW) Applications, display applications, and system control applications), a single distinct VE, which is reusable within that domain, would be necessary. The VE is intended to be re-usable within the same application domain (such as control applications) across all systems that have such an application. The data objects are defined such that they define all system-unique (and customized) features and characteristics, yet which are understandable by the corresponding VE;

Once such a VE is available for an application domain (such as system control or display), all systems with such an application, whether it is for an airplane, bank, car, etc., can all use the corresponding VE. All that needs to be done for each of such systems is to define and design the data objects representing the specific system characteristics.

Since the generic embedded technology architecture consistent with the present invention is a "mother" technology, its actual implementation in an application domain is performed using existing technologies. The VE (code) only needs to be verified/certified for the first system. After that, the verification/certification cost and schedule of the application software for the subsequent configurations of such system or other systems that need similar applications, is reduced to data (and not code) verification and certification, and their confidence tests for VE integration, since the VE (code) part is unchanged. This type of certification requires significantly less effort (cost and schedule) than the traditional certification tasks for such an application.

With respect to FIG. 1, the various elements which make up the generic embedded application technology architecture consistent with the present invention will now be described. FIG. 2 shows the steps involved with the operation of the architecture consistent with the present invention.

Figure 2:
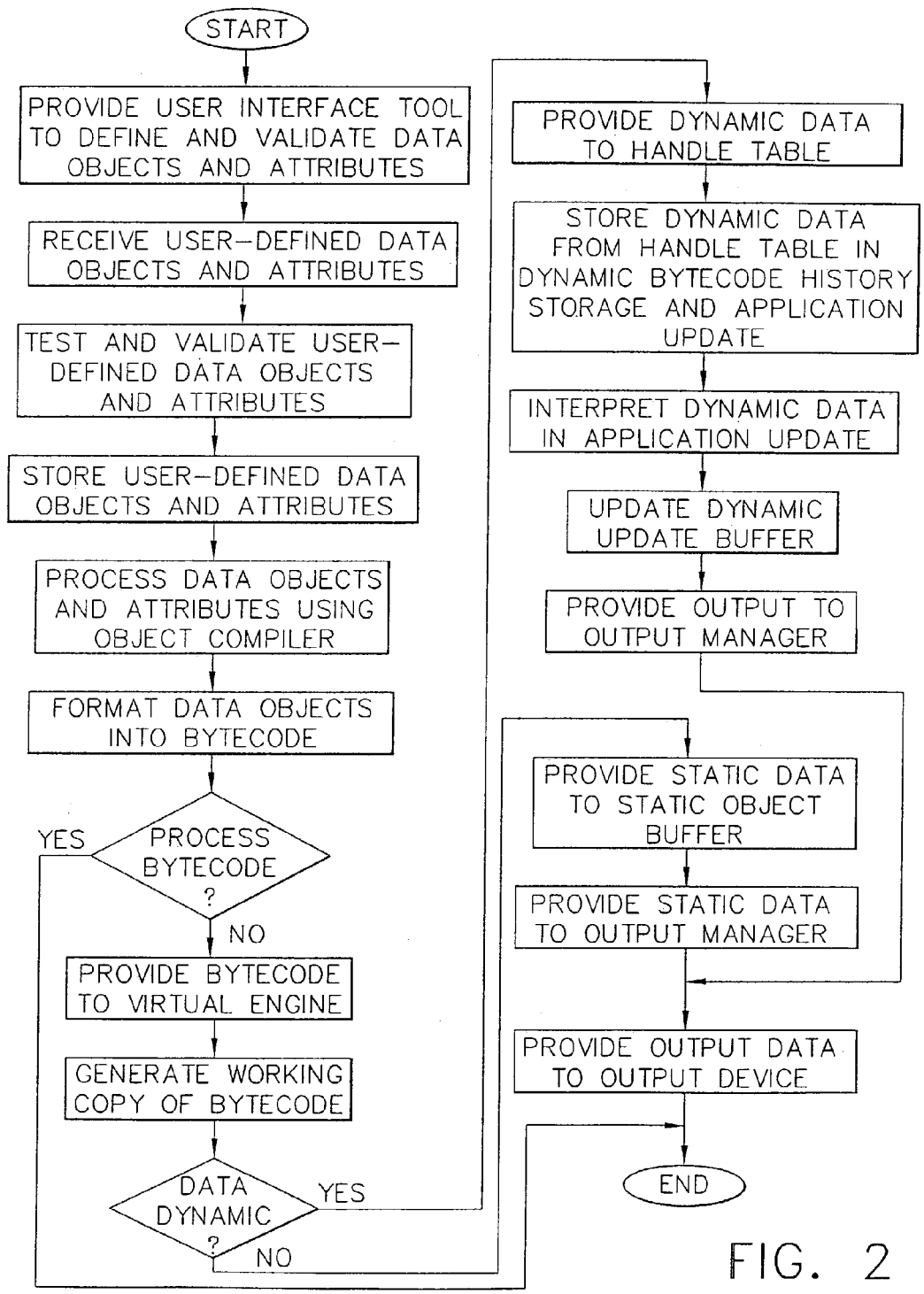
FIG. 2 is a flowchart showing the operational steps in one embodiment of the methods and system consistent with the present invention.

As shown in FIG. 1, the generic architecture consistent with the present invention, has a set of support tools, shown as the User Interface Tool 100 runing in memory 120 on a data processing system such as a personal computer (PC) 101. These support tools allow end-users and system designers/analysts to interact with the VE 102 to rapidly design, modify, and/or test and validate the embedded application software (on both host and target). There is a unique tool for each application domain.

The User Interface Tool 100 is menu-driven so the user or system designer can easily manipulate the embedded software objects and data (that is, the system and domain specific data).

The data objects must be defined in a specific format and syntax. The data objects can be defined as either static or dynamic objects. Each of the objects can have a number of user defined attributes that further define the object. One of the attributes of the dynamic objects, for example, is a pointer to the location of the source that determines the updated values of the dynamic data. Other attributes, for example, include "update rate" or a pointer to where the domain specific arithmetic or logic operation for such an object may be stored. For each domain, the number and types of objects and their attributes can be quite different.

Thus, the methods and system consistent with the architecture of the present invention, allow handling of dynamic objects and their attributes, and uses the data objects and the VE as building blocks of a larger integrated system, allowing data objects to be driven by external events (such as a user command), or changed based on a timing profile (such as cyclic updates). This dynamic capability is important in embedded systems.

Finally, each data object is required to be encapsulated (separated, hidden—not visible to or shared across data objects) such that it localizes the data interpretation and processing errors. Thus, a problem associated with one data object cannot propagate or corrupt the processing of any other data object. As will be appreciated by those skilled in the art, this encapsulation improves reliability.

Once the objects are defined, the User Interface Tool 100 immediately allows the user to test the resulting embedded software on the target (without any need for embedded software programming, software compilation, linking, software loading, etc.) to validate the format and completeness of the objects.

Using the User Interface Tool 100, the domain expert knowledge is captured in a human-readable form and is stored in a database 118 at the PC 101 (or at a remote server) for further processing. This database 118 uses a domain-specific syntax defined for each kind of database record, and its content can be reviewed and modified by the user. This information is then processed by an "object compiler" 119 at the PC 101 (may be inside User Interface Tool 100) for syntax checking and semantic analysis. The object compiler 119 formats or transforms the human readable format of the data objects to a context free, optimized set of low level primitive instructions, called "Bytecode" 103. The compiler 119 can be embedded within the User Interface Tool 100, or can be a separate tool that can be used by the user in association with the User Interface Tool 100. In either case, the compiler 119 resides and is executed on the PC 101. The compiler 119 associates objects and their attributes with memory addresses from a user-supplied "load map" (list that specifies the source of external inputs or outputs for an application). Each attribute may be manipulated by direct target memory reference or through more complex mechanisms. Each object maintains a static copy of its original attribute data, a dynamic copy, and storage for computational data, and reference to any unique error handling. The compiler 119 maintains a master list of all objects and attributes.

The Bytecode 103 is produced by the compiler 119 and provided to the Application 104 for processing (interpretation) by the Virtual Engine 102. The Application 104 runs in memory and includes the Bytecode 103 and the Virtual Engine 102. The Application 104 can reside and be executed in two general types of computer configurations: (a) on the host computer (PC 101) where local testing and validation of the application software can take place, or (b) on a target computer that is part of the operational system, such as an airplane, a car, or the computer used in a bank. In the target computer configuration case, the Bytecode 103 can be sent to the Virtual Engine 102 on the operational system (in one embodiment, over a network using TCP/IP, for example). Then, the Bytecode 103 is matched to the capabilities of the VE 102 (in this case) for processing and interpreting them, regardless of which computer configuration (host or target) is being used. The user can access and analyze/correct errors generated by the compiler 119 on the PC 101.

The "Bytecode" 103 includes an organized set of information on the static and dynamic data elements that define the components and the attributes of the application function within the given system. The format, syntax, and semantics of the Bytecode 103 are part of its interface with the VE 102 that must be defined thoroughly and optimally to maximize the execution performance of application software.

Thus, the Bytecode 103 provides all the information needed by the VE 102 to produce the desired functionality and products intended for the application software 104. In other words, the Bytecode 103 is a binary compilation of the information initially produced by the user and stored in the database 118, and is understood by the domain-specific VE 102.

To elaborate, the VE 102 itself is a compilation of the underlying machine instructions (hence, code). The VE 102 processes (interprets) object information based on a set of rules, and the static and dynamic attributes of the objects. The VE interprets the compiler code in units of objects.

In contrast, the Bytecode 103 is a compilation of "instructions" for the VE 102. The underlying computing machine (i.e., the host or target computer) does not execute the Bytecode 103 directly. Hence the Bytecode 103 is treated by the computer as data.

Since the Bytecode 103 includes both dynamic and static object (or data) elements, and the dynamic elements change, preferably a Working Copy 105 of the Bytecode 103 can be generated within the direct control by the VE 102 for its convenient management and updates; although this is not necessary if the Bytecode 103 can be correctly maintained and updated.

The Static Object Buffer 106, within the VE 102, is a data storage for storing the static data of the Bytecode 103, and making it available to the Output Manager 107.

The dynamic data of the Bytecode, from the Working Copy 105, is handled by the Handle Table 108 in the VE 102, which is intended to allow the VE 102 to manage multiple sets of dynamic data. The Handle Table 108 includes information on where each data set is stored (data pointers) and the list of the actual output data.

The Dynamic Bytecode History 109 of the VE 102 is a storage for such dynamic data from the Handle Table 108, in case of errors and recovery from erroneous situations, and/or if there is a need for access to the past data. In that event, the Dynamic Bytecode History 109 will update the Application Update 110 (described below).

The Dynamic Update Buffer 111 is a set of data storage for the dynamic data used by the VE 102, which receives the dynamic data from the Handle Table 108. Use of this "separate" storage prevents incorrect usage or access of the dynamic data while such data is still being updated in the Handle Table 108.

The Application Update 110 is a main processing engine of the VE 102. The Application Update 110 interprets the data and updates the Dynamic Update Buffer 111 accordingly. The Application Update 110 generates the outputs that represent information provided in the Bytecode 103. For example, the Bytecode 103 indicates that if data item X exceeds data item Y, then data item Z must be provided to the Output Manager 107 for sending it to the Output Device 115 (or 113, 114, or 116). This element of the VE 102 is executed by the computer cyclically, to generate the desired outputs periodically.

The Output Manager 107, which is part of the Application 104, interfaces with the desired Output Devices 113–116 and provides them the final data. The output of the Output Manager is provided with exact format and characteristics of the Output Devices (in this example, Output Devices 113–116).

Finally, the Stop Application 117 allows the user to stop the execution of the VE 102, and all outputs to the Output Manager 107, which then deletes the Handle Table and Buffers.

Thus, the methods and system consistent with the present invention include an architecture (supported by a User Interface Tool) that minimizes the need for software programming. This allows a system user or designer to define the data objects for his/her unique system, integrate them with the re-usable VE, and generate the customized application software without the need for programming. Methods and systems consistent with the present invention automate the generation of embedded software applications beyond automatic generation of code, and greatly simplify their maintenance. Further, the present invention can be implemented on different computer platforms (processors), and implemented in different languages (such as Ada and C++). Thus, significant reduction in cost and schedule can be achieved during definition, validation, production and maintenance of embedded application software.

The performance of the design architecture is acceptable for both display and diagnostic application domains, and can be used for rapid development (in a matter of minutes) of embedded software in many systems, including, but not limited to, air, ground, and space transportation systems, real-time systems, communication systems, military systems, commercial and industrial systems, ground control, maintenance, and support facilities, and test and simulation facilities, and the like.

One of ordinary skill in the art would appreciate the above-described embodiments of the invention are merely possible examples of implementations which are set forth for a clear understanding of the principles of the invention. For example, one of ordinary skill in the art would appreciate methods, systems, and articles of manufacture consistent with the present invention may also be implemented in a client-server environment. In that case, a client computer system and server computer system are each connected to a network, such as a Local Area Network, Wide Area Network, or the Internet. Some or all of the code or data can be stored on either the client or the server computer system, and some or all of the steps of the processes can be carried out on the server computer system, which is accessed by the client computer system over the network.

Further, although aspects of one implementation are depicted as being stored in memory, one of ordinary skill in the art would appreciate that all or part of the systems and method consistent with the present invention may be stored on or read from other computer-readable media, such as secondary storage devices, like hard disks, floppy disks, and CD-ROM; a carrier wave received from a network such as the Internet; or other forms of ROM or RAM. Further, one of ordinary skill in the art would appreciate that a generic embedded technology architecture suitable for use with methods, systems, and articles of manufacture consistent with the present invention may contain additional or different components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of creating a predetermined application using a generic embedded application technology architecture, the method comprising:

receiving via a user interface tool a set of user-defined data objects and attributes of said data objects, the data objects and attributes having format and syntax specific to the domain of the predetermined application;

formatting said data objects into a Bytecode that defines components and attributes of the predetermined application;

providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and generating an output, via said Virtual Engine, that represents information, functionality, and behavior provided in said Bytecode.

2. The method according to claim 1 wherein said Virtual Engine is reusable within a domain.

3. The method according to claim 2 wherein said Virtual Engine is only verified/certified for a first system application within a domain.

4. The method according to claim 2 wherein a number and type of said data objects and said attributes of said data objects are different for each domain.

5. The method according to claim 1 further comprising providing a user interface tool with which to define and validate the data objects and attributes of said data objects.

6. The method according to claim 5 wherein said user interface tool is provided on a data processing system.

7. The method according to claim 1 wherein said data objects are both application unique and understandable by said Virtual Engine.

8. The method according to claim 1 wherein said data objects are defined as at least one of static and dynamic objects.

9. The method according to claim 1 wherein said data objects are defined in a specific format and syntax.

10. The method according to claim 1 wherein each of said data objects is encapsulated.

11. The method according to claim 1 further comprising storing said set of user-defined data objects and attributes of said objects in a memory.

12. The method according to claim 11 further comprising processing said data objects stored in said memory using an object compiler.

13. The method according to claim 12 wherein said formatting step is performed by said object compiler to produce said Bytecode.

14. The method according to claim 1, further comprising generating, using said Virtual Engine, a Working Copy of said Bytecode for management and updates.

15. The method according to claim 1 further comprising storing static data of said Bytecode in a Static Object Buffer.

16. The method according to claim 1, wherein the Virtual Engine has a Dynamic Bytecode History storage and the method further comprises storing dynamic data from said location identified by one of the pointers in said Handle Table to said Dynamic Bytecode History storage for error recovery.

17. The method according to claim 1, wherein the Virtual Engine has a Dynamic Update Buffer and the method further comprises storing dynamic data from said location identified by one of the pointers in said Handle Table to said Dynamic Update Buffer to prevent one of incorrect usage and access of said dynamic data during updating by said Handle Table.

18. The method according to claim 17 further comprising interpreting said dynamic data and updating said Dynamic Update Buffer accordingly.

19. The method according to claim 18 wherein said interpreting and updating step is performed cyclically to generate desired outputs periodically.

20. The method according to claim 1 wherein said generating step is performed by an Application Update.

21. The method according to claim 1 further comprising providing said output to an Output Manager which provides at least one Output Device with final data.

22. The method according to claim 21 wherein said Output Manager is provided with exact format and characteristics of said at least one Output Device.

23. The method according to claim 21 further comprising:
stopping execution of said Virtual Engine and all said output to said Output Manager.

24. The method according to claim 1 further comprising testing and validating said user-defined data objects.

25. A method of creating a predetermined application using a generic embedded application technology architecture, the method comprising:
receiving a set of user-defined data objects and attributes having format and syntax specific to the domain of the predetermined application created using a user interface tool;
transforming said user-defined data objects into a Bytecode, said Bytecode operatively configured to provide information needed by a Virtual Engine to produce a predetermined functionality and products intended for the predetermined application;
storing static data of said Bytecode in a Static Object Buffer and making the Static Object Buffer available to an Output Manager;
managing multiple sets of dynamic data of said Bytecode via a Handle Table which includes information on where each dynamic data set is stored and a list of actual output data;
storing dynamic data in a Dynamic Update Buffer to prevent one of incorrect usage and access of said dynamic data while said dynamic data is still being updated via said Handle Table;
interpreting said dynamic data and updating said Dynamic Update Buffer with said interpreted data; and
generating output from said Dynamic Update Buffer to said Output Manager that represents information provided in said Bytecode.

26. A system for creating a predetermined application from a generic embedded application technology architecture, the system comprising:
means for receiving via a user interface tool a set of user-defined data objects and attributes of said objects having format and syntax specific to the to the domain of the predetermined application;
means for formatting said data objects into a Bytecode that defines components and attributes of the application;
means for providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and
means for generating an output, via said Virtual Engine, that represents information and functionality provided in said Bytecode.

27. A system for creating a predetermined application using a generic embedded application technology architecture, the system comprising:
means for receiving a set of user-defined data objects and attributes having format and syntax specific to the domain of the predetermined application created using a user interface tool;
means for transforming said user-defined data objects into a Bytecode, said Bytecode provides information needed by a Virtual Engine to produce a predetermined functionality and products intended for the predetermined application;
means for storing static data of said Bytecode in a Static Object Buffer and making the Static Object Buffer available to an Output Manager;
means for managing multiple sets of dynamic data of said Bytecode via a Handle Table which includes information on where each dynamic data set is stored and a list of actual output data;
means for storing dynamic data in a Dynamic Update Buffer to prevent one of incorrect usage and access of said dynamic data while said dynamic data is still being updated via said Handle Table;
means for interpreting said dynamic data and updating said Dynamic Update Buffer with said interpreted data; and
means for generating output to said Output Manager from said Dynamic Update Buffer, that represents information provided in said Bytecode.

28. The system according to claim 27 further comprising means for generating a Working Copy of said Bytecode from which said static data and said dynamic data are obtained.

29. The system according to claim 27 further comprising means for stopping execution of said Virtual Engine and all said output to said Output Manager.

30. An computer-implemented apparatus for creating a predetermined application using a generic embedded application technology architecture, the apparatus comprising a computer having:

a user interface tool which creates data objects and attributes of said data objects having format and syntax specific to the domain of the predetermined application;

an object compiler which formats said data objects and said attributes into a Bytecode;

a Virtual Engine which interprets said Bytecode to produce a predetermined functionality and products intended for the predetermined application, said Virtual Engine having a Handle Table derived from said Bytecode, said Handle Table including a plurality of pointers, each pointer identifying a respective location for storing dynamic data associated with a corresponding one of the data objects; and an output generator generating an output, via said Virtual Engine, that represents information and functionality provided in said Bytecode.

31. The apparatus according to claim 30 wherein said object compiler is embedded within the user interface tool.

32. The apparatus according to claim 31 wherein said object compiler resides and is executed on a data processing system.

33. The apparatus according to claim 30 wherein said object compiler maintains a master list of all said data objects and said attributes of said data objects.

34. The apparatus according to claim 30 further comprising means for generating a Working Copy of said Bytecode.

35. The apparatus according to claim 34 further comprising a Static Object Buffer which stores static data from said Working Copy of said Bytecode.

36. The apparatus according to claim 30 wherein said Bytecode is displayed and executed on one of a host computer where local testing and validation of the predetermined application can take place, and a target computer that is part of an operating system.

37. The apparatus according to claim 30 further comprising a Dynamic Update Buffer which stores dynamic data to prevent one of incorrect usage and access of said dynamic data while said dynamic data is still being updated via said Handle Table.

38. The apparatus according to claim 37 further comprising an Application Update which interprets said dynamic data and updates said Dynamic Update Buffer with said interpreted data.

39. The apparatus according to claim 38 further comprising an Output Manager which provides final data to at least one Output Device from said Dynamic Update Buffer.

40. The apparatus according to claim 39 further comprising at least one Output Device to which final data from said Output Manager is provided.

41. The apparatus according to claim 37 further comprising a Dynamic Bytecode History storage which stores said dynamic data from said location identified by one of the pointers in said Handle Table for error recovery.

42. The apparatus according to claim 30 wherein said Virtual Engine is reusable within a domain.

43. The apparatus according to claim 42 wherein a number and type of said data objects and said attributes of said data objects are different for each domain.

44. The apparatus according to claim 30 wherein said data objects are both application unique and understandable by said Virtual Engine.

45. The apparatus according to claim 30 wherein said Virtual Engine is verified/certified for a first system application within a domain only.

46. The apparatus according to claim 30 wherein said user interface tool is provided on a data processing system.

47. The apparatus according to claim 30 wherein said data objects are defined as at least one of static and dynamic.

48. The apparatus according to claim 30 wherein said data objects are defined in a specific format and syntax.

49. The apparatus according to claim 30 wherein each of said data objects is encapsulated.

50. The apparatus of claim 30 further comprising a database in which said user interface tool stores said data objects and attributes.

51. A tangible computer-readable medium whose contents cause a computer system to create a predetermined application using a generic embedded application technology architecture, the contents containing a software program that performs the steps of:

receiving via a user interface tool a set of user-defined data objects and attributes of said objects having format and syntax specific to the domain of the predetermined application;

formatting said data objects into a Bytecode that defines components and attributes of the predetermined application;

providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and generating an output, via said Virtual Engine, that represents information and functionality provided in said Bytecode.

52. A tangible computer-readable medium whose contents cause a computer system to create a predetermined application using a generic embedded application technology architecture, the contents containing a software program that performs the steps of:

receiving a set of user-defined data objects and attributes having format and syntax specific to the domain of the predetermined application created using a user interface tool;

transforming said user-defined data objects into a Bytecode, said Bytecode operatively configured to provide information needed by a Virtual Engine to produce a predetermined functionality and products intended for the predetermined application;

storing static data of said Bytecode in a Static Object Buffer and making the Static Object Buffer available to an Output Manager;

managing multiple sets of dynamic data of said Bytecode in a Handle Table which includes information on where each dynamic data set is stored and a list of actual output data;

storing dynamic data in a Dynamic Update Buffer to prevent one of incorrect usage and access of said dynamic data while said dynamic data is still being updated via said Handle Table;

interpreting said dynamic data and updating said Dynamic Update Buffer with said interpreted data; and generating output to said Output Manager from said Dynamic Update Buffer that represents information provided in said Bytecode.

53. A computer system for creating a predetermined application using a generic embedded application technology architecture, the computer system comprising:

a memory including:

at least one program for receiving via a user interface tool a set of user-defined data objects and attributes of said objects having format and syntax specific to the domain of the predetermined application; formatting said data objects into a Bytecode that defines components and attributes of the predetermined application; providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and generating an output that represents information and functionality provided in said Bytecode; and a processor for running said program and generating an output, via said Virtual Engine, that represents information and functionality provided in said Bytecode.

* * * * *